(12) United States Patent
Hayashi

(10) Patent No.: US 11,386,891 B2
(45) Date of Patent: Jul. 12, 2022

(54) DRIVING ASSISTANCE APPARATUS, VEHICLE, DRIVING ASSISTANCE METHOD, AND NON-TRANSITORY STORAGE MEDIUM STORING PROGRAM

(71) Applicant: TOYOTA JIDOSHA KABUSHIKI KAISHA, Toyota (JP)

(72) Inventor: Naoki Hayashi, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 180 days.

(21) Appl. No.: 16/538,204

(22) Filed: Aug. 12, 2019

(65) Prior Publication Data
US 2020/0135193 A1    Apr. 30, 2020

(30) Foreign Application Priority Data
Oct. 31, 2018  (JP) .............................. JP2018-205421

(51) Int. Cl.
*B60W 30/00* (2006.01)
*B60W 30/08* (2012.01)
*B60W 30/095* (2012.01)
*B60W 40/08* (2012.01)
*G10L 15/22* (2006.01)

(52) U.S. Cl.
CPC ........ *G10L 15/22* (2013.01); *G10L 2015/223* (2013.01); *G10L 2015/228* (2013.01)

(58) Field of Classification Search
USPC .................. 701/1–124, 29.1–34.4, 400–539, 701/300–302; 704/1–10, 200–275
See application file for complete search history.

(56) References Cited

U.S. PATENT DOCUMENTS

| | | | |
|---|---|---|---|
| 2002/0128762 A1 | 9/2002 | Noguchi et al. | |
| 2007/0219709 A1* | 9/2007 | Ikeda | G02B 27/01 701/516 |
| 2013/0204457 A1* | 8/2013 | King | B60R 16/0373 701/1 |
| 2015/0051753 A1* | 2/2015 | Kawamata | G01S 7/54 701/1 |
| 2015/0120124 A1* | 4/2015 | Bartels | B60W 50/14 701/23 |
| 2015/0206532 A1 | 7/2015 | Fujisawa et al. | |
| 2018/0093676 A1* | 4/2018 | Emura | G05D 1/0061 |
| 2018/0339714 A1* | 11/2018 | Smid | G06K 9/00845 |
| 2018/0354517 A1* | 12/2018 | Banno | B60W 50/14 |

FOREIGN PATENT DOCUMENTS

| | | |
|---|---|---|
| JP | 2000-163091 A | 6/2000 |
| JP | 2002-12100 A | 1/2002 |
| JP | 2015-135419 A | 7/2015 |

* cited by examiner

*Primary Examiner* — Marcellus J Augustin
(74) *Attorney, Agent, or Firm* — Oliff PLC

(57) ABSTRACT

A driving assistance apparatus includes a memory and a processor including hardware. The processor is configured to acquire voice information uttered by a driver, recognize content of the voice information, output information on content of a process based on a recognition result of the voice information before executing the process, and execute the process when an approval signal that approves the execution of the process is input from an operation member disposed on a steering wheel that the driver holds to steer a vehicle.

7 Claims, 4 Drawing Sheets ary. As such, steering
DRIVING ASSISTANCE APPARATUS, VEHICLE, DRIVING ASSISTANCE METHOD, AND NON-TRANSITORY STORAGE MEDIUM STORING PROGRAM

INCORPORATION BY REFERENCE

The disclosure of Japanese Patent Application No. 2018-205421 filed on Oct. 31, 2018, including the specification, drawings, and abstract, is incorporated herein by reference in its entirety.

BACKGROUND

1. Technical Field

The present disclosure relates to a driving assistance apparatus, a vehicle, a driving assistance method, and a non-transitory storage medium storing a program.

2. Description of Related Art

A technology for allowing a user to understand in an interactive manner that a voice command uttered by the user is accepted by a voice recognition terminal device is known (see, for example, Japanese Unexamined Patent Application Publication No. 2015-135419 (JP 2015-135419 A)). This technology enables the user to recognize that the voice command is accepted by outputting a coupling language as voice information during a stand-by time from the moment when the driver utters the voice command to the moment when a voice recognition device recognizes the voice command.

SUMMARY

However, since the above-described technology in JP 2015-135419 A executes a process based on the content of an utterance recognized by the voice recognition device, a process different from that intended by the driver is executed when the voice recognition device misrecognizes the utterance.

The present disclosure provides a driving assistance apparatus, a vehicle, a driving assistance method, and a non-transitory storage medium storing a program, capable of reliably executing the process intended by a driver.

A driving assistance apparatus according to a first aspect of the present disclosure includes a memory, and a processor including hardware. The processor is configured to: acquire voice information uttered by a driver; recognize the content of the voice information; output information on the content of a process based on a recognition result of the voice information before executing the process; and execute the process when an approval signal that approves execution of the process is input from an operation member disposed on a steering wheel that the driver holds to steer a vehicle.

Further, the processor may determine whether a level indicating a correlation between the content of the process and steering by autonomous driving is equal to or higher than a predetermined level, and output the information on the content of the process when the level indicating the correlation between the content of the process and the steering by autonomous driving is equal to or higher than the predetermined level.

With the above aspect, when the process based on the recognition result of the voice information is equal to or higher than the predetermined level, the information on the content of the process based on the recognition result of the voice information is displayed on a meter. As such, steering of the vehicle that is not intended by the driver can be prevented from being automatically executed.

In addition, the processor may determine whether a time period for which the driver inputs the approval signal reaches a time period corresponding to the level of the content of the process, and execute the process when the time period for which the driver inputs the approval signal reaches the time period corresponding to the level of the content of the process.

With the above aspect, since the driver has to keep pressing an approval switch for the time period corresponding to the level of the content of the process, safety can be enhanced.

Moreover, a vehicle according to a second aspect of the present disclosure includes: the driving assistance apparatus; a microphone configured to receive an input of a voice uttered by a driver and generate voice information; a meter configured to display information on the content of a process; and a steering wheel. The operation member is disposed at a position where the operation member is operable by the driver while the driver is holding the steering wheel.

With the above aspect, it is possible for the driver to approve the execution of the process based on the driver's utterance without taking the driver's hand off the steering wheel.

In addition, the steering wheel may include an activation switch that is disposed adjacent to the operation member and activates the microphone.

With the above aspect, it is possible for the driver to approve the execution of the process based on the driver's utterance without checking an area around the driver's hand.

Further, a driving assistance method according to a third aspect of the present disclosure is executed by a driving assistance apparatus. The driving assistance method includes: a step of acquiring voice information uttered by a driver; a step of recognizing the content of the voice information stored in a memory; a step of outputting information on the content of a process based on a recognition result of the voice information before executing the process; and a step of executing the process when an approval signal that approves the execution of the process is input from an operation member disposed on a steering wheel that the driver holds to steer a vehicle.

In addition, a fourth aspect of the present disclosure relates to a non-transitory storage medium storing a program executed by a driving assistance apparatus. The program causes the processor of the driving assistance apparatus to: acquire voice information uttered by a driver; recognize the content of the voice information; output information on the content of a process based on a recognition result of the voice information before executing the process; and execute the process when an approval signal that approves the execution of the process is input from an operation member disposed on a steering wheel that the driver holds to steer a vehicle.

With each aspect of the present disclosure, since a process is executed when an approval signal that approves the execution of the process is input after information on the content of the process based on a recognition result of the voice information is output, only the process intended by a driver can be reliably executed.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Hereinafter, embodiments will be described in detail with reference to the accompanying drawings. Further, the present disclosure is not limited to the following embodiments. In addition, like signs denote like elements in the following description.

Configuration of Vehicle

Figure 1:
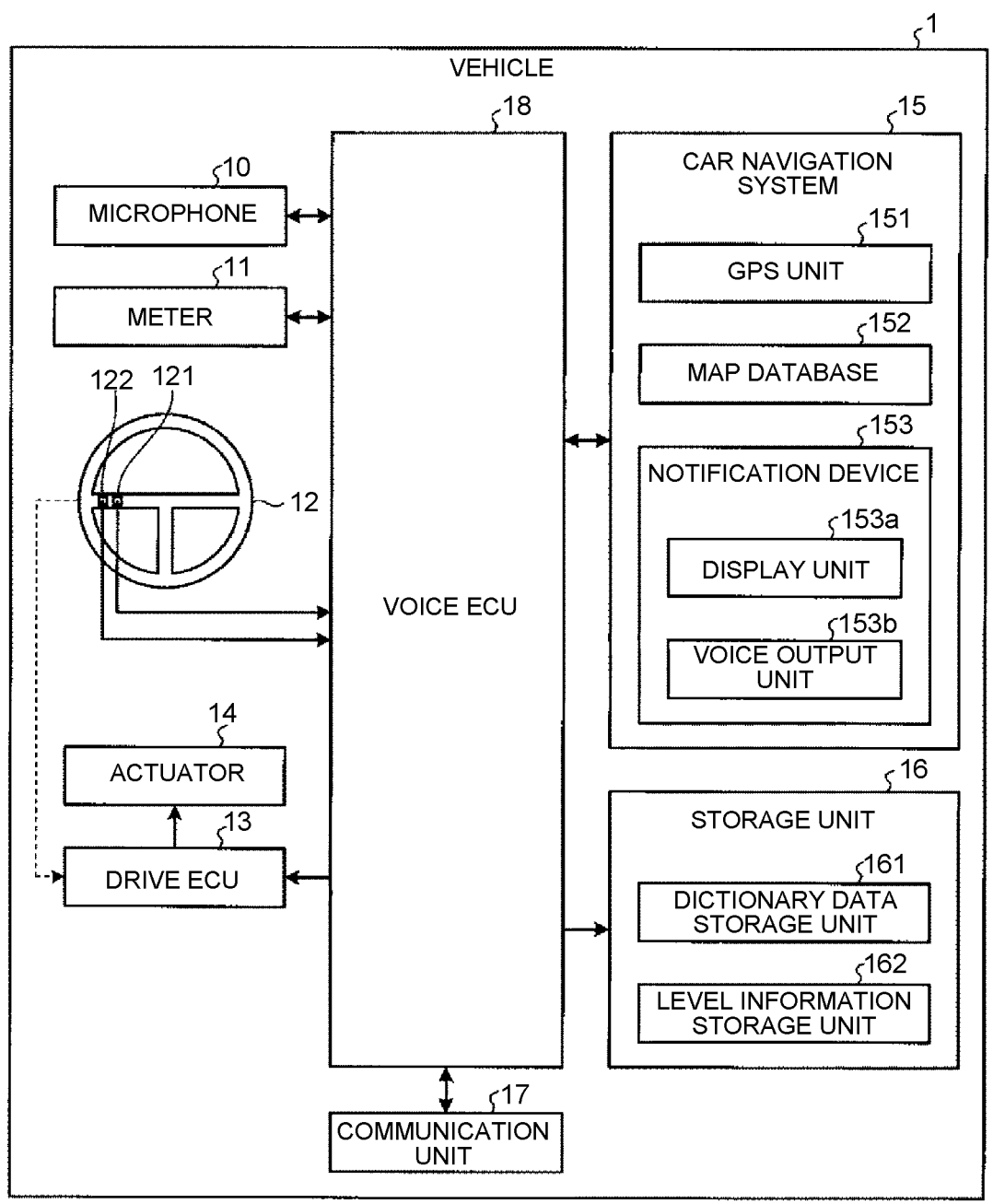
FIG. 1 is a block diagram illustrating a functional configuration of a vehicle according to one embodiment.

First, a configuration of a vehicle according to one embodiment will be described. FIG. 1 is a block diagram illustrating a functional configuration of a vehicle according to one embodiment. The vehicle 1 illustrated in FIG. 1 includes a microphone 10, a meter 11, a steering wheel 12, a drive electronic control unit (ECU) 13, an actuator 14, a car navigation system 15, a storage unit 16, a communication unit 17, and a voice ECU 18.

Under the control of the voice ECU 18, the microphone 10 receives an input of a voice uttered by a driver, generates voice information by executing a predetermined voice processing, such as amplification processing, A/D conversion processing, and gain adjustment processing, on the received voice, and outputs the generated voice information to the voice ECU 18. The microphone 10 includes a directional microphone or a stereo microphone, digital signal processor (DSP), and the like.

The meter 11 displays information for the driver to recognize a driving state while driving the vehicle 1. The meter 11 includes an instrument, such as a tachometer, which displays current speed information of the vehicle 1 or current engine RPM of the vehicle 1, and a display, such as liquid crystal and organic electro luminescence (EL), which displays information input from the voice ECU 18.

The steering wheel 12 steers the vehicle 1 depending on an operation of the driver. The steering wheel 12 includes an activation switch 121 that receives an input of an activation signal that activates voice recognition, and an approval switch 122 that receives an input of an approval signal that approves a process based on a recognition result of the voice recognition. Each of the activation switch 121 and the approval switch 122 is disposed at a position where they are operable by the driver while the driver is holding the steering wheel 12. Furthermore, the activation switch 121 and the approval switch 122 are disposed adjacent to each other on the steering wheel 12.

The drive ECU 13 controls the drive of the actuator 14 depending on an operation of the steering wheel 12. In addition, the drive ECU 13 also controls the drive of the actuator 14 depending on a process input from the voice ECU 18. The drive ECU 13 includes a memory and a processor having hardware, such as a central processing unit (CPU).

The actuator 14 is driven under the control of the drive ECU 13. The actuator 14 includes, for example, an engine.

The car navigation system 15 includes a global positioning system (GPS) unit 151, a map database 152, and a notification device 153.

The GPS unit 151 receives a signal from a GPS satellite and calculates a position of the vehicle 1 based on the received signal. The GPS unit 151 includes a GPS reception sensor and the like.

The map database 152 stores various types of map data. The map database 152 includes a recording medium, such as a hard disk drive (HDD) and a solid state drive (SSD).

The notification device 153 includes a display unit 153a that displays an image, a video, and text information, and an audio output unit 153b that generates a sound such as a voice and an alarm. The display unit 153a includes a display, such as liquid crystal and organic EL. The voice output unit 153b includes a speaker and the like.

The car navigation system 15 having the above-described configuration superimposes the vehicle 1's current position that is acquired by the GPS unit 151 on the map data stored in the map database 152, and then provides, via the display unit 153a and the voice output unit 153b, the driver with information including the road on which the vehicle 1 is currently travelling, a route to a destination, and the like.

The storage unit 16 includes a dictionary data storage unit 161 that stores dictionary data which the voice ECU 18 uses to recognize the voice information when recognizing a voice, and a level information storage unit 162 that stores level information indicating a level of each process based on a result of voice recognition by the voice ECU 18. The storage unit 16 includes a semiconductor memory such as a read-only memory (ROM) and a random access memory (RAM), and recording media such as an HDD and an SSD.

Figure 2:
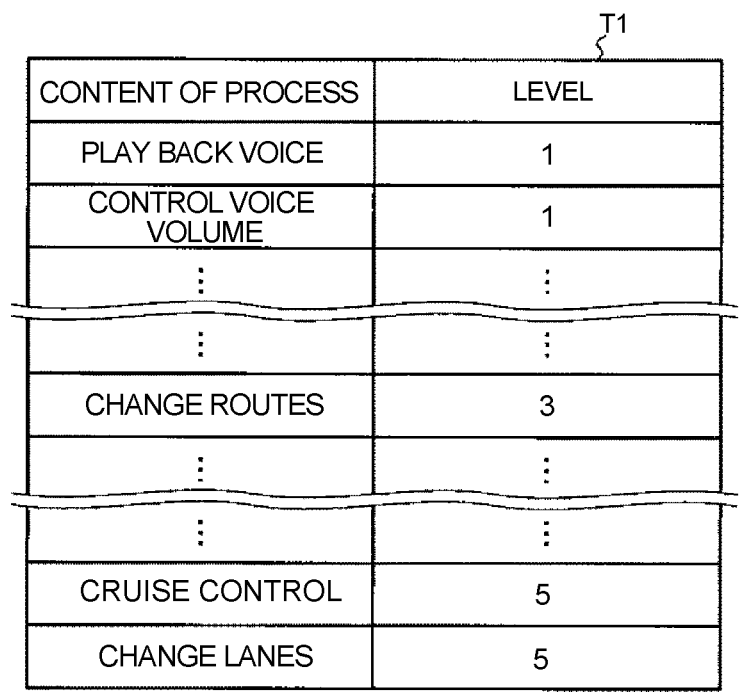
FIG. 2 is a diagram illustrating one example of level information stored in a level information storage unit.

Here, the level information stored in the level information storage unit 162 will be described. FIG. 2 is a diagram illustrating an example of level information stored in the level information storage unit 162.

Level information T1 illustrated in FIG. 2 is information in which the content of the process based on the result of the voice recognition executed by the voice ECU 18, is associated with a level. Here, the level refers to a value indicating a correlation between the content of the process based on the result of the voice recognition and steering by autonomous driving of the vehicle 1. Specifically, as the level is higher, the content of the process is set to be more closely related to the steering by autonomous driving. For example, in the level information T1 illustrated FIG. 2, when the content of the process is "voice playback" that plays back voice data, the content is associated with level "1" since the content is not related to the steering by autonomous driving of the vehicle 1 at all. Further, in the level information T1, when the content of the process is "changing routes" that changes the route to the destination of the vehicle 1, the content is associated with level "3" since the content is remotely related to the steering by autonomous driving of the vehicle 1. Moreover, in the level information T1, when the content of the process is "cruise control" for automatically steering the vehicle 1 while maintaining a distance to a vehicle ahead, the content is associated with level "5" since the content is closely related to the steering by autonomous driving of the vehicle 1.

Returning to FIG. 1, the description on the configuration of the vehicle 1 will be continued. Under the control of the voice ECU 18, the communication unit 17 simultaneously transmits and receives various pieces of information according to a predetermined communication standard via a base station and a network. The communication unit 17 includes a communication module capable of wireless communication.

The voice ECU 18 acquires the voice information uttered by the driver from the microphone 10. The voice ECU 18 recognizes the content of the voice information acquired from the microphone 10, and, before executing the process based on the recognition result of the voice information, outputs information on the content of the process to the meter 11. When the approval signal that approves the execution of the process is input from the approval switch 122 disposed on the steering wheel 12 that the driver holds to steer the vehicle 1, the voice ECU 18 executes this process. Further, the voice ECU 18 determines whether the level associated with the process is equal to or higher than a predetermined level. When the content of the process based on the recognition result of the voice information is equal to or higher than the predetermined level (in the example of FIG. 2, level 3 or higher), the voice ECU 18 outputs information on the content of the process to the meter 11. The voice ECU 18 includes a memory, and a processor having hardware, such as a CPU. In addition, in one embodiment, the voice ECU 18 functions as a driving assistance apparatus.

Process of Voice ECU

Figure 3:
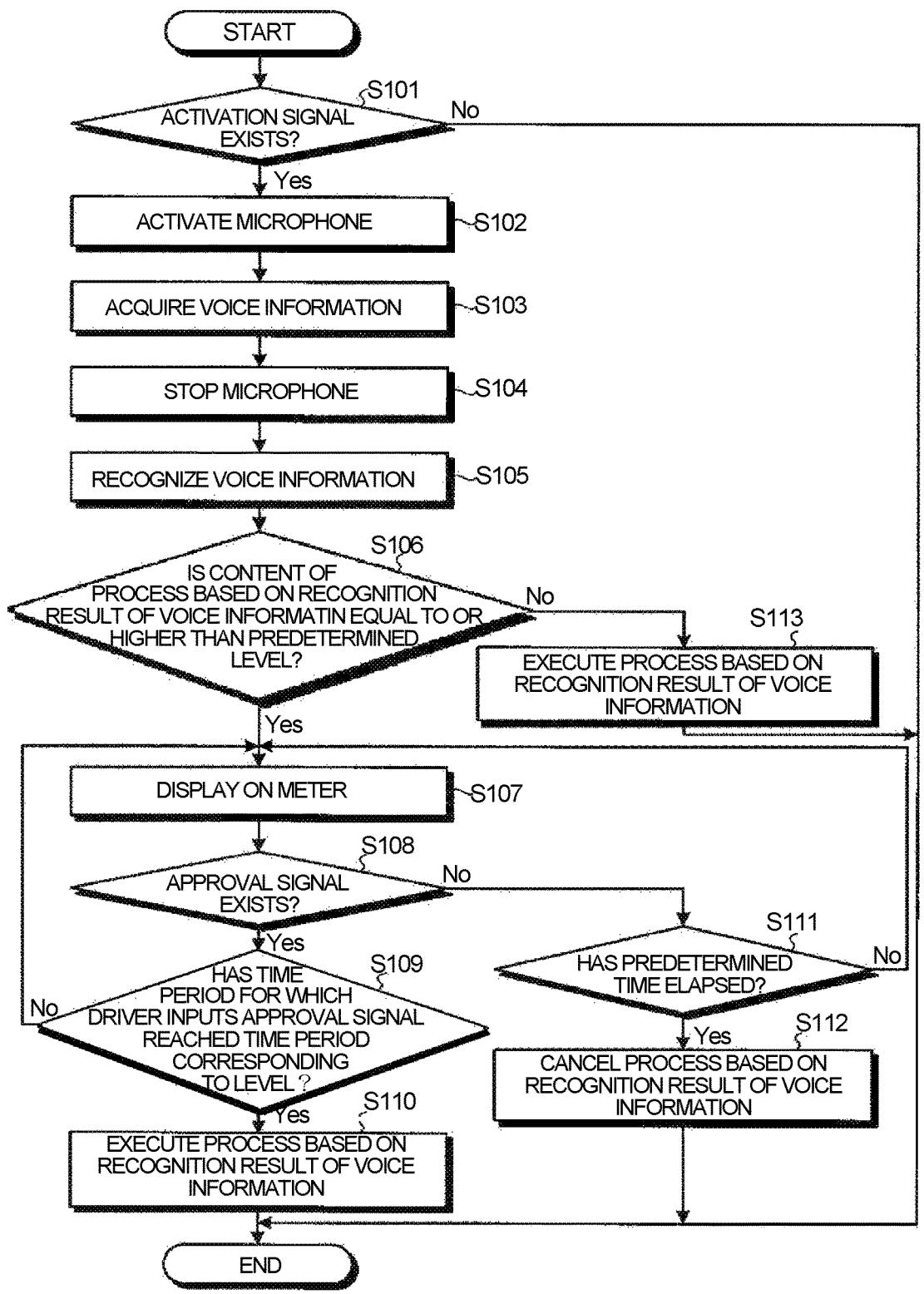
FIG. 3 is a flowchart illustrating an overview of processing executed by a voice ECU.

Next, a process executed by the voice ECU 18 will be described. FIG. 3 is a flowchart illustrating an overview of the process executed by the voice ECU 18.

As illustrated in FIG. 3, when an activation signal is input from the activation switch 121 (step S101: Yes), the voice ECU 18 activates the microphone 10 (step S102), and acquires, from the microphone 10, the voice information input by the driver's utterance within a predetermined time (step S103).

Subsequently, the voice ECU 18 stops the microphone 10 (step S104). Then, the voice ECU 18 recognizes the voice information acquired from the microphone 10 using the dictionary data stored in the dictionary data storage unit 161 (step S105).

Then, based on the level information T1 stored in the level information storage unit 162, the voice ECU 18 determines whether the content of the process based on the recognition result of the voice information is equal to or higher than a predetermined level (step S106). When the content of the process based on the recognition result of the voice information is equal to or higher than the predetermined level (step S106: Yes), the voice ECU 18 proceeds to step S107 to be described below. On the other hand, when the content of the process based on the recognition result of the voice information is less than the predetermined level (step S106: No), the voice ECU 18 proceeds to step S113 to be described below.

Figure 4:
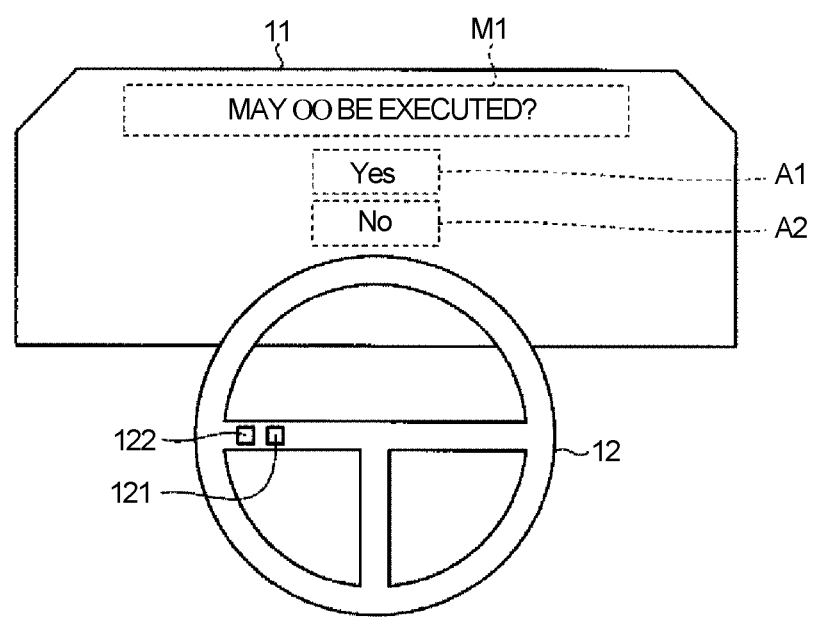
FIG. 4 is a schematic diagram illustrating one example of a display shown by a meter.

In step S107, the voice ECU 18 outputs, to the meter 11, the information on the content of the process based on the recognition result of the voice information to cause the meter 11 to display the information. Specifically, as illustrated in FIG. 4, the voice ECU 18 causes the meter 11 to display a message M1, "May OO be executed?", as information. Further, the voice ECU 18 causes the meter 11 to display an icon A1 that approves the execution of the process based on the recognition result of the voice information and an icon A2 that cancels the execution of the process. As such, since the meter 11 displays the information on the content of the process before the voice ECU 18 executes the process based on the recognition result of the voice information, the driver can understand whether the content of the process is intended by the driver.

Subsequently, when the approval signal that approves the execution of the process based on the recognition result of the voice information is input from the approval switch 122 (step S108: Yes) and a time period for which the driver inputs the approval signal reaches a time period corresponding to the level of the content of the process (step S109: Yes), the voice ECU 18 executes the process based on the recognition result of the voice information (step S110). Here, the time period corresponding to the level of the content of the process is set longer as the level of the content of the process is higher. For example, in the case of level 3, the time period is set to 0.5 seconds, and in the case of level 5, the time period is set to 3 seconds. In this manner, even if the driver erroneously operates the approval switch 122, the process is not executed since the driver is required to continue pressing the approval switch 122 for the time period corresponding to the level of the content of the process to be executed. As such, safety can be enhanced. After step S110, the voice ECU 18 ends the process.

When the approval signal that approves the execution of the process based on the result of the voice recognition is input from the approval switch 122 (step S108: Yes) and the time period for which the driver inputs the approval signal does not reach the time period corresponding to the level of the content of the process (step S109: No), the voice ECU 18 returns to step S107.

In step S108, when the approval signal that approves the execution of the process based on the result of the voice recognition is not input from the approval switch 122 (step S108: No), the voice ECU 18 proceeds to step S111.

Subsequently, when a predetermined time elapses since the meter 11 has displayed the information (step S111: Yes), the voice ECU 18 cancels the process based on the recognition result of the voice information (step S112). After step S112, the voice ECU 18 ends the process. Further, when the activation switch 121 is pressed before the predetermined time elapses, the voice ECU 18 may cancel the process based on the recognition result of the voice information.

In step S111, when the predetermined time does not elapse since the meter 11 has displayed the information (step S111: No), the voice ECU 18 returns to step S107 described above.

In step S113, the voice ECU 18 executes the process based on the recognition result of the voice information. After step S113, the voice ECU 18 ends the process.

According to one embodiment described above, before executing the process based on the recognition result of the voice information uttered by the driver, the voice ECU 18 outputs the information on the content of the process based on the recognition result of the voice information to the meter 11. Then, when the approval signal that approves the execution of the process is input from the approval switch 122, the voice ECU 18 executes the process based on the recognition result of the voice information. As such, the process intended by the driver can be executed.

Further, according to one embodiment, the voice ECU 18 outputs, to the meter 11, the information on the content of the process based on the recognition result of the voice information when the level of the content of the process based on the recognition result of the voice information is equal to or higher than the predetermined level. As such, the steering of the vehicle 1 that is not intended by the driver can be prevented from being automatically executed.

Moreover, according to one embodiment, the voice ECU 18 executes the process based on the recognition result of the voice information when the time period for which the driver inputs the approval signal via the approval switch 122 reaches the time period corresponding to the level of the content of the process based on the recognition result of the voice information. Therefore, even if the driver erroneously operates the approval switch 122, the process is not executed since the driver is required to continue pressing the approval switch 122 for the time period corresponding to the level of the content of the process to be executed. As such, safety can be enhanced.

In addition, according to one embodiment, since the approval switch 122 is disposed at a position where the operation member is operable by the driver while the driver is holding the steering wheel 12, the driver can approve the execution of the process based on the driver's utterance without taking the driver's hand off the steering wheel 12.

Further, according to one embodiment, since the approval switch 122 is disposed at a position adjacent to the activation switch 121 on the steering wheel 12, the driver can approve the execution of the process based on the driver's utterance without checking an area around the driver's hand.

In addition, according to one embodiment, the voice ECU 18 outputs, to the meter 11, the information on the content of the process based on the recognition result of the voice information. Alternatively, the voice ECU 18 may output, to the meter 11, the information on the content of the process based on the recognition result of the voice information and the current position of the vehicle 1 that is detected by the car navigation system 15. For example, when the process based on the recognition result of the voice information is cruise control at a speed of 100 km/h, and the legal speed limit of a road corresponding to the current position of the vehicle 1 that is detected by the car navigation system 15 is 80 km, the voice ECU 18 may output, to the meter 11, information indicating that the vehicle 1 is cruise-controlled at the speed of 80 km/h.

Moreover, according to one embodiment, the voice ECU 18 executes voice recognition on the voice information acquired from the microphone 10. Alternatively, the voice ECU 18 may execute the voice recognition on the voice information, for example, in conjunction with a server capable of executing recognition on a voice acquired from the outside, via the communication unit 17. Certainly, the server capable of executing the voice recognition may acquire the voice information via the communication unit 17 of the vehicle 1, and output, to the voice ECU 18, the recognition result of the acquired voice information or output, to the meter 11, information on the content of the process based on the result of the voice recognition of the voice information via the voice ECU 18.

Further, according to one embodiment, when the process based on the recognition result of the voice information is less than the predetermined level, the voice ECU 18 executes the process based on the recognition result of the voice information. Alternatively, when the process based on the recognition result of the voice information is less than the predetermined level, the voice ECU 18 may, for example, output, to the meter 11, the information on the content of the process and execute the process based on the recognition result of the voice information by the driver's utterance. In other words, in one embodiment, it may be determined whether to execute the process by the approval switch 122, which is the operation member, or the driver's utterance depending on the level of the process based on the recognition result of the voice information.

Other Embodiments

Moreover, in the vehicle according to one embodiment, the "unit" described above can be read as a "circuit" or the like. For example, the communication unit can be read as a "communication circuit".

In addition, the program executed by the driving assistance apparatus according to one embodiment is recorded and provided on a computer-readable storage medium as file data in an installable or executable format, such as a CD-ROM, a flexible disk (FD), a CD-R, a digital versatile disk (DVD), a USB, and a flash memory.

Further, the program executed by the driving assistance apparatus according to one embodiment may be stored on a computer connected to a network such as the Internet, and provided by being downloaded via the network.

In the description of the flowchart in the present specification, although the anteroposterior relationship between the steps of the process is clearly described using expressions, such as "first", "thereafter", and "continued", the order of the steps of the process required for executing the present embodiment is not solely determined by these expressions. In other words, the order of the steps of the process in the flowchart described in the present specification can be changed within a scope of generating no contradiction.

Other effects and modifications can be easily derived by those skilled in the art. Broader aspects of the present disclosure are not limited to specific details and representative embodiments, shown and described above. Accordingly, various modifications may be made within a range not departing from the scope of the general inventive concept as defined by the appended claims and their equivalents.

What is claimed is:

1. A driving assistance apparatus comprising:
a memory;
a processor including hardware, wherein the processor is configured to:
acquire voice information uttered by a driver;
recognize content of the voice information;
output information prompting the driver to confirm acceptance of a content of a process to be executed based on a recognition of the content of the voice information before executing the process;
execute the process when an approval signal that approves the execution of the process is input from an operation member disposed on a steering wheel that the driver holds to steer a vehicle;
determine whether a level indicating a correlation between the content of the process to be executed based on a recognition of the content of the voice information and steering by autonomous driving is equal to or higher than a predetermined level; and
output the information prompting the driver to confirm acceptance of the content of the process when the level indicating the correlation between the content of the process and the steering by autonomous driving is equal to or higher than the predetermined level.

2. The driving assistance apparatus according to claim 1, wherein the processor is configured to:
determine whether a time period for which the driver inputs the approval signal reaches a time period corresponding to the level of the content of the process; and,
execute the process when the time period for which the driver inputs the approval signal reaches the time period corresponding to the level of the content of the process.

3. A vehicle comprising:
the driving assistance apparatus according to claim 1;
a microphone configured to receive an input of a voice uttered by a driver and generate voice information;
a meter configured to display the information prompting the driver to confirm acceptance of the content of the process; and
the steering wheel, wherein the operation member is at a position where the operation member is operable by the driver while the driver is holding the steering wheel.

4. The vehicle according to claim 3, wherein the steering wheel includes an activation switch that is disposed adjacent to the operation member and activates the microphone.

5. The driving assistance apparatus according to claim 1, wherein the content of the process includes cruise control.

6. A driving assistance method executed by a driving assistance apparatus, the method comprising:
   acquiring voice information uttered by a driver;
   recognizing content of the voice information stored in a memory;
   outputting information prompting the driver to confirm acceptance of a content of a process to be executed based on a recognition of the content of the voice information before executing the process;
   executing the process when an approval signal that approves the execution of the process is input from an operation member disposed on a steering wheel that the driver holds to steer a vehicle;
   determining whether a level indicating a correlation between the content of the process to be executed based on a recognition of the content of the voice information and steering by autonomous driving is equal to or higher than a predetermined level; and
   outputting the information prompting the driver to confirm acceptance of the content of the process when the level indicating the correlation between the content of the process and the steering by autonomous driving is equal to or higher than the predetermined level.

7. A non-transitory storage medium storing a program executed by a driving assistance apparatus, wherein the program causes a processor of the driving assistance apparatus to:
   acquire voice information uttered by a driver;
   recognize content of the voice information;
   output information prompting the driver to confirm acceptance of a content of a process to be executed based on a recognition of the content of the voice information before executing the process;
   execute the process when an approval signal that approves the execution of the process is input from an operation member disposed on a steering wheel that the driver holds to steer a vehicle;
   determine whether a level indicating a correlation between the content of the process to be executed based on a recognition of the content of the voice information and steering by autonomous driving is equal to or higher than a predetermined level; and
   output the information prompting the driver to confirm acceptance of the content of the process when the level indicating the correlation between the content of the process and the steering by autonomous driving is equal to or higher than the predetermined level.

* * * * *